United States Patent
Slavin

(10) Patent No.: US 9,967,042 B2
(45) Date of Patent: May 8, 2018

(54) REMOTELY TESTING OPERATIONAL COMPONENTS OF A MOBILE DEVICE

(71) Applicant: Sure, Inc., San Diego, CA (US)

(72) Inventor: Wayne Slavin, Santa Monica, CA (US)

(73) Assignee: SURE, INC., San Diego, CA (US)

(*) Notice: Subject to any disclaimer, the term of this patent is extended or adjusted under 35 U.S.C. 154(b) by 0 days. days.

(21) Appl. No.: 15/383,915

(22) Filed: Dec. 19, 2016

(65) Prior Publication Data
US 2017/0195069 A1    Jul. 6, 2017

Related U.S. Application Data

(60) Provisional application No. 62/275,196, filed on Jan. 5, 2016.

(51) Int. Cl.
 *H04B 17/17* (2015.01)
 *H04B 17/29* (2015.01)

(52) U.S. Cl.
 CPC ............ *H04B 17/17* (2015.01); *H04B 17/29* (2015.01)

(58) Field of Classification Search
 CPC ................................. H04B 17/17; H04B 17/29
 USPC ....................................................... 455/67.7
 See application file for complete search history.

(56) References Cited

U.S. PATENT DOCUMENTS

| | | | | |
|---|---|---|---|---|
| 7,596,373 B2* | 9/2009 | McGregor | ............ | H04W 24/00 455/418 |
| 7,917,260 B2* | 3/2011 | Ubik | .................... | H04W 24/00 455/41.2 |
| 8,423,014 B2* | 4/2013 | McGregor | ........... | H04B 17/309 455/418 |
| 8,682,307 B2* | 3/2014 | Oesterling | ............ | H04W 4/046 455/404.1 |
| 8,938,201 B2* | 1/2015 | Boulton | ................ | G01S 5/0221 455/67.11 |
| 2010/0190439 A1* | 7/2010 | Huang | .................... | H04L 67/12 455/41.2 |
| 2015/0288464 A1* | 10/2015 | Tanner | ................... | H04B 17/15 455/41.1 |
| 2016/0014623 A1* | 1/2016 | Tanner | ................. | H04B 5/0031 455/41.1 |

\* cited by examiner

*Primary Examiner* — April G Gonzales
(74) *Attorney, Agent, or Firm* — Lowenstein Sandler LLP

(57) ABSTRACT

Implementations of the disclosure provide for to remotely testing operational components of a mobile device. In one implementation, a method is provided. The method includes providing, by a server processing device, instructions to a mobile device for a user to interact with a component of the mobile device. Data associated with an operation of the component in view of the instructions is received. The received data is compared to a model input characterizing a functional level associated with the operation of the component. Thereupon, it is determined whether there is a depleted operation of the component in view of the comparison.

12 Claims, 5 Drawing Sheets

REMOTELY TESTING OPERATIONAL COMPONENTS OF A MOBILE DEVICE

CROSS REFERENCE TO RELATED APPLICATION

This application claims the benefit of U.S. Provisional Application No. 62/275,196, filed Jan. 5, 2016, the entire disclosure of which is incorporated herein by this reference.

TECHNICAL FIELD

The subject matter described herein relates to communications between devices over a network, and more specifically, to remotely testing operational components of a mobile device.

BACKGROUND

Insurance and warranty carriers typically sell protection plans for mobile devices, such as smartphones and tablets, primarily at a point of purchase of the mobile device. At that time, carriers can ensure that the device is operational in accordance with a vendor specific and is not damaged due to it being previously used by an end-user (e.g., the device is "new" and has not left the store). This approach by the carriers protects them from fraud in such cases where a potential customer might purchase insurance for the broken device prior to making a claim. In some situations, if a mobile device owner does not acquire device insurance at the point of sale, they may not be able to later acquire such insurance without a physical inspection of the device. Similarly, purchasers of second hand devices (e.g., devices previously used by an end-user) may be unable to acquire insurance without a physical inspection to ensure that the device is not damaged.

DESCRIPTION OF DRAWINGS

The disclosure is illustrated by way of example, and not by way of limitation, and will become apparent upon consideration of the following detailed description, taken in conjunction with the accompanying drawings, in which like reference characters refer to like parts throughout, and in which.

DETAILED DESCRIPTION

Figure 1:
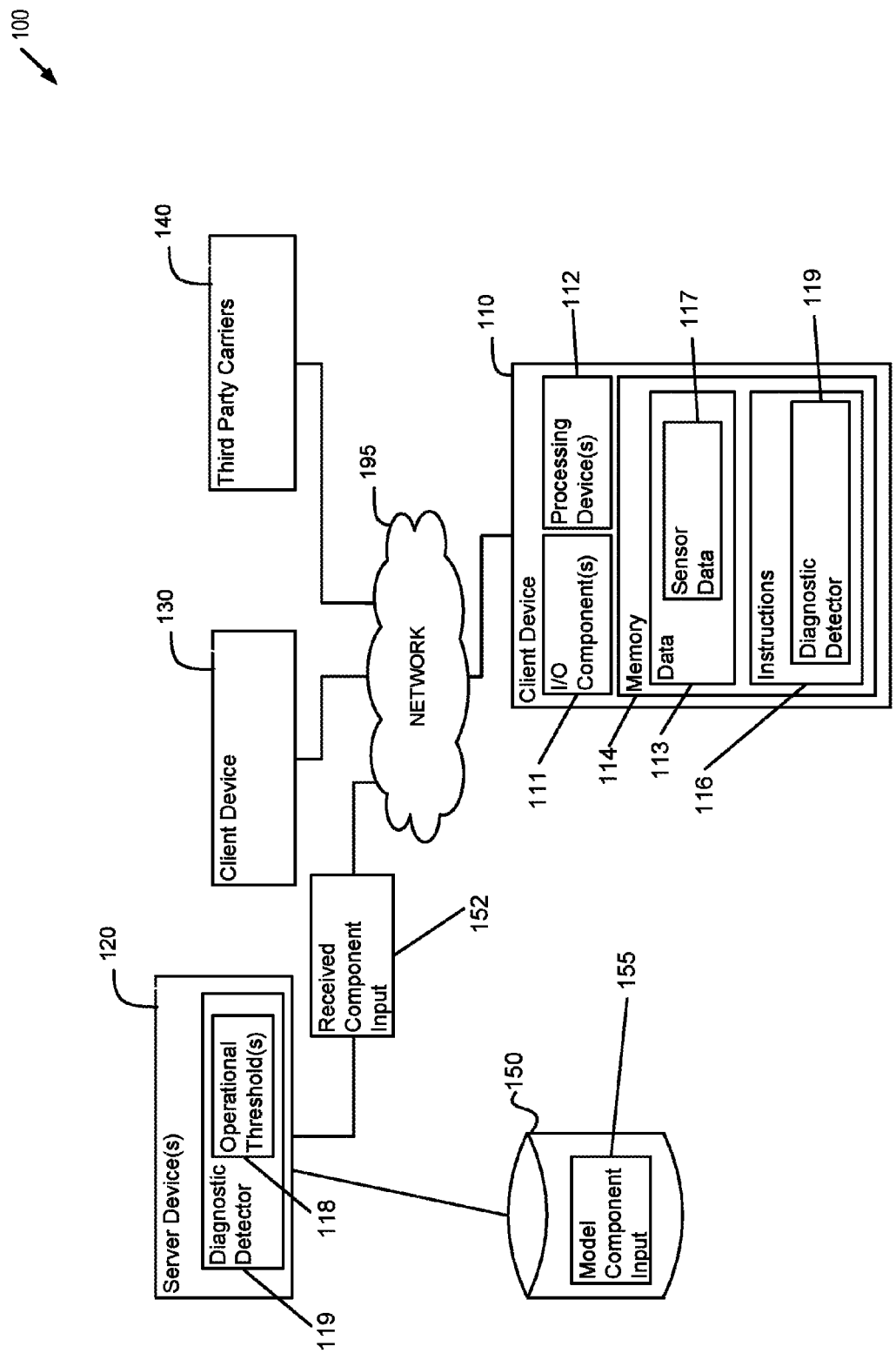
FIG. 1 is a system block diagram illustrating an example system in which implementations of the disclosure may operate.

Implementations of the disclosure relate to performing remote diagnostic testing of components of a mobile device, such as input/output components of a mobile phone, to give the device a "health check." The testing may be remote such that the device does not need to be physically located in a factory, store, or repair facility. It is contemplated that the systems and methods described herein may trigger the delivery of product offerings for the mobile device based on the results of its health check. However, so as to illustrate system functionality and corresponding processing of remotely determining a health status, and not by way of limitation, the product offering described herein is an exemplary insurance product. It is envisioned that one skilled in the art could make and use the system described herein to offer a plurality of product offerings in response to the health status of a mobile device based in part on the results of performing remote diagnostic testing of its components.

The techniques of this disclosure enable a server computing device of an insurance computing platform to remotely assess whether a mobile device is properly functioning. This assessment can be used, for example, for providing an insurance policy or warranty for the device. As such, the mobile device "health check" enables remote insurance or warranty underwriting of the device. This can occur at any stage during the life cycle of the device rather than just at the point of purchase. The current subject matter can enable provision of insurance or warranty to users that may have been previously unable to acquire such insurance on the device. This increases the opportunity and potential to sell device insurance for carriers. In addition, the test may be used to validate operation of a device for a second-hand sale so that end users can certify their pre-owned devices.

In some implementations, the server computing device can determine whether components of a mobile device are functioning properly by remotely instructing the device to perform various component tests. These tests may involve the server computing device transmitting instructions to the mobile device to execute certain functions of a component in a particular manner. The server computing device may receive response input from the mobile device based on the test, and compare this input to a model input. If the received input and the model input are substantially similar, the component is determined to be operational within determined limits and/or undamaged. If the received input and the model input substantially differ, the component is determined to be non-operational and/or damaged.

In another implementation, the server computing device may transmit instructions to the mobile device to operate a first component having output capabilities, and concurrently a second component having input capabilities. In this example, the first component receives input from the second component. The received input from the second component may be compared with a model input. If the received input from the second component substantially similar to the model input, one or both of the components can be assessed as functional and/or undamaged. If the received input from the second component substantially differs from the model input, one or both of the components can be assessed as non-functional and/or damaged. For example, a speaker component of the mobile device may be instructed by the server computing device to play a certain sound file so that the speaker outputs sounds in a predefined frequencies and amplitudes. A microphone component of the mobile device is instructed by the server computing device to concurrently record the sound being generated by the speaker. Thereafter, the server computing device may analyze the recording to determine if either the speaker or microphone is damaged.

The subject matter described herein provides many technical advantages. For example, an advantage of the techniques disclosed herein is that it enables semi-autonomous testing of mobile devices after they have been used by end-users without requiring a skilled technician to perform the tests. This enables insurance or warranty underwriting at any stage during the life cycle of the device without the physical presence of the device being needed. In some situations, the techniques enable provisioning of insurance or warranty products to users without having to bring the device to a psychical location. This increases the opportunity and potential to sell device insurance to users for which this was previously unavailable. Furthermore, the remote testing of the mobile device can be periodically triggered so that results can be compared over time to assess the performance of components of the device for determine further products offerings that can be provided to a user of the device.

FIG. 1 is a system block diagram illustrating an example system 100 in which implementations of the disclosure may operate. In some implementations, the system 200 comprises a computing platform that can employ communications between computing devices over a network to remotely test operational components of those devices. As shown, the system 100 includes a plurality of client computing devices 110 and 130, such as mobile phone, personal data assistant (PDA), smartphone, laptop/netbook, tablet and etc., coupled to network 195, and one or more server computing devices, such as server device 120, capable of communicating with the client computing devices 110 and 130 over the network 195. In some implementations, the network 195 may be a private network (e.g., a local area network (LAN), Wi-Fi, Bluetooth, Radio Frequency), a wide area network (WAN), intranet, etc.), or a public network (e.g., the Internet).

Server device 120 may be at one node of network 195 and capable of directly and indirectly communicating with other nodes of the network 195. For example, the server device 110 may include a web server that may be capable of communicating with the client devices 110 and 130 via network 195 such that it uses the network 195 to transmit/deliver and display information to a participant on a display associated with mobile devices. In some implementations, the server device 110 may also include a plurality of computers that exchange information with different nodes of a network for the purpose of receiving, processing and transmitting data to the client devices 110 and 130.

Each of the computing devices of system 100, such as client device 110, includes one or more one or more I/O (input/output) components 111, processors 112, memory 114, and other components typically present in general purpose computers. "Processor" or "Processing device" herein refers to a device capable of executing instructions encoding arithmetic, logical, or I/O operations. In one illustrative example, a processor may include an arithmetic logic unit (ALU), a control unit, and a plurality of registers. In a further aspect, a processor may be a single core processor that is typically capable of executing one instruction at a time (or process a single pipeline of instructions), or a multi-core processor that may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU). "Memory" herein refers to a volatile or non-volatile memory device, such as RAM, ROM, EEPROM, or any other device capable of storing data. "I/O component" herein refers to a device capable of providing an interface between a processor and an external device capable of inputting and/or outputting binary data.

Although, for simplicity, a single processor 112 is depicted in FIG. 1, in some other implementations computer system 100 may comprise a plurality of processors. Similarly, in some other implementations computer system 100 may comprise a plurality of I/O devices, rather than a single I/O component.

Data 113 may be retrieved, stored or modified by processors 112 in accordance with the instructions 116. For instance, although the present disclosure is not limited by a particular data structure, the data 118 may be stored in computer registers, in a relational database as a table having a plurality of different fields and records, XML documents, or flat files. The data 113 may also be formatted in a computer-readable format such as, but not limited to, binary values, ASCII or Unicode. By further way of example only, the data 113 may comprise information sufficient to identify the relevant information, such as numbers, descriptive text, proprietary codes, pointers, references to data stored in memory or information that is used by a function to calculate the relevant sensor data 117 associated with the functioning of various I/O components.

Instructions 116 of the computing devices may be a set of instructions to be executed directly (such as machine code) or indirectly (such as scripts) by the processor 112. In that regard, the terms "instructions," "steps" and "programs" may be used interchangeably herein. The instructions 116 may be stored in object code format for direct processing by the processors 112, or in another computer language including scripts or collections of independent source code modules that are interpreted on demand or compiled in advance.

To facilitate operations of system 100 for remotely testing operational components of the client devices, the system 100 may include a diagnostic detector application 119 to facilitate communications between the client devices 110 and 130 and the server device 120 via network 195. In one implementation, the application 119 may be installed and/or a service may be selected in order to obtain the benefits of the techniques described herein. In an implementation, all of a part of the diagnostic detector application 119 may be downloaded from the server device 120 onto the client devices 110 or 130. For example, a user may elect to download the application 119 from a service associated with an online server or it may be pre-loaded on the mobile device. The client devices 110 or 130 may transmit a request for the application 119 over network 195 and, in response, receive the application 119 from the service.

In some implementations, the diagnostic detector application 119 may communicate, for example, via an application programming interface (API), with an operating system (not shown) of the client device 110 that can control the I/O components 111 and other hardware of the device. The I/O components 111 can include, for example, various I/O ports (such as a charging or headphone port), a battery, display, touchscreen, keyboard, input/output buttons (such as a home button, power button, volume buttons, mute button, and the like), microphone, speakers, camera, flash, headphone jack, etc. The diagnostic detector application 119 may issues certain test to determine whether one or more of the I/O components 111 is non-functioning or damaged.

In alternative implementations, the diagnostic detector application 119 may be instructed to access one or more sensors of the client device to read sensor data 117 related to the I/O components 111. For example, an accelerometer or humidity sensor may be used to determine if the I/O components 111 of the device 110 were affected by a recent and sudden impact or possibly exposed to water. The diagnostic detector application 119 may also verify if charging/ charging port associated with the client device 110 is functional. In addition, data from usage of the battery component and life-cycles may be checked to determine if the device is in need of a replacement battery. In some implementations, the results of the determination of whether there is a depleted operation in one or more of the I/O components 111 are provided, for example, to third party carries 140 for provisioning of device insurance (e.g., personal property insurance) for the device 110.

The third party carriers 140, in implementations, may offer certain product offerings to protect the device 110 from damage. These third party carriers 140 may determine pricing, and/or other terms for product offerings based on the test results produced by the diagnostic detector application 119. For example, the third party carriers 1440 may be computing systems operated by insurance carriers that include APIs for interacting with system 100. In some implementations, the system 100 may receive information from the third party carriers 140 regard various schedules of rates and product policies of the third party carriers 140 that are available for the client device 110 based on the determined functionality of its I/O components 111.

In example implementations, in order for the diagnostic detector application 119 to perform diagnostic tests of the I/O components 111, the application 119 may instruct the device 110 perform certain functions or provide data related to a user interaction with the I/O components. For example, the diagnostic detector application 119 can provide instructions that are displayed at the client device 100. The instructions may direct the user to interact with one of the I/O components 111 of the device 110. For example, the user may be instructed to perform a hand gesture (e.g., press, swipe,) at the display (e.g., touchscreen component) according to a specific pattern. This may include touching specific areas of the touchscreen including swiping/or rubbing parts of the screen that correspond with an area of the touchscreen in which the pattern is being displayed.

The diagnostic detector application 119 can receive component input data 152 or a signal characterizing operation of the I/O component 111. This may include, for example, a signal indicating where and when a user has touched a touchscreen. The application 119 may then compare the received component input data 152 (or signal) to data characterizing what the model component input 155 would be if the component were operational in accordance with a vendor specific. For example, if the component is a touchscreen, the model input can include data characterizing locations (on the display) and sequences (in time) of the user touching the screen. If the received component input data 152 and the model component input 155 correspond, it can be determined that the I/O component 111 is operational.

The model component input 155 may be stored, for example, in a data store 150 accessible to one or more of the computing devices or other devices of system 100. In some implementations, the model component input 155 can be predetermined and/or predefined. For example, the model component input 155 can be based on optimal measurements specification obtained from a manufacture or vendor of the component being tested, or a similar known-to-be operational component associated with an operational device that was previously stored in the data store 150.

In some implementations, the model component input 155 is not directly compared to the received component input 152. Rather, the model component input 155 maybe compared to a particular operation of other software and/or hardware on the device 110. For example, to test a headphone jack, the user can be instructed to plug a headphone into an audio port of the device 100. If a signal is received by the diagnostic detector application 119 regarding the device's transition of the audio output component between the speaker and headphones, it can use this signal to determine whether the audio port is non-operational or functioning properly.

The diagnostic detector application 119, in an implementation, can generate an error metric based on a difference between the received component input 152 and the model component input 155. This error metric may be compared to a predetermined operational threshold 118 associated with the operation of the component. For example, if the error metric for the tested component is below the operational threshold 118 or value, the diagnostic detector application 119 may determine that the component is functioning properly or within a normal level. For example, for each position on the touchscreen that a user is instructed to touch, an error metric can include the distance away from the position that the received signal indicates was touched. If the distance is below the threshold 118, then the diagnostic detector application 119 may determine that the distance is within acceptable limits indicating that the component is functioning properly. If the distance is meets or is above the threshold 118, the diagnostic detector application 119 may determine the component is not functioning properly or otherwise damaged.

In another implementation, the error metric may be related to specific predefined conditions associated with the I/O components being tested. For example, if the received input indicates that a particular region of a touchscreen did not measure an input (despite instructions to the user to touch that region of the touchscreen), this can indicate that the touchscreen is non-operational and/or damaged. In this example, the diagnostic detector application 119 may instruct the user to perform the test a second time before it determines whether the I/O component is non-operational or functioning properly.

Figure 2:
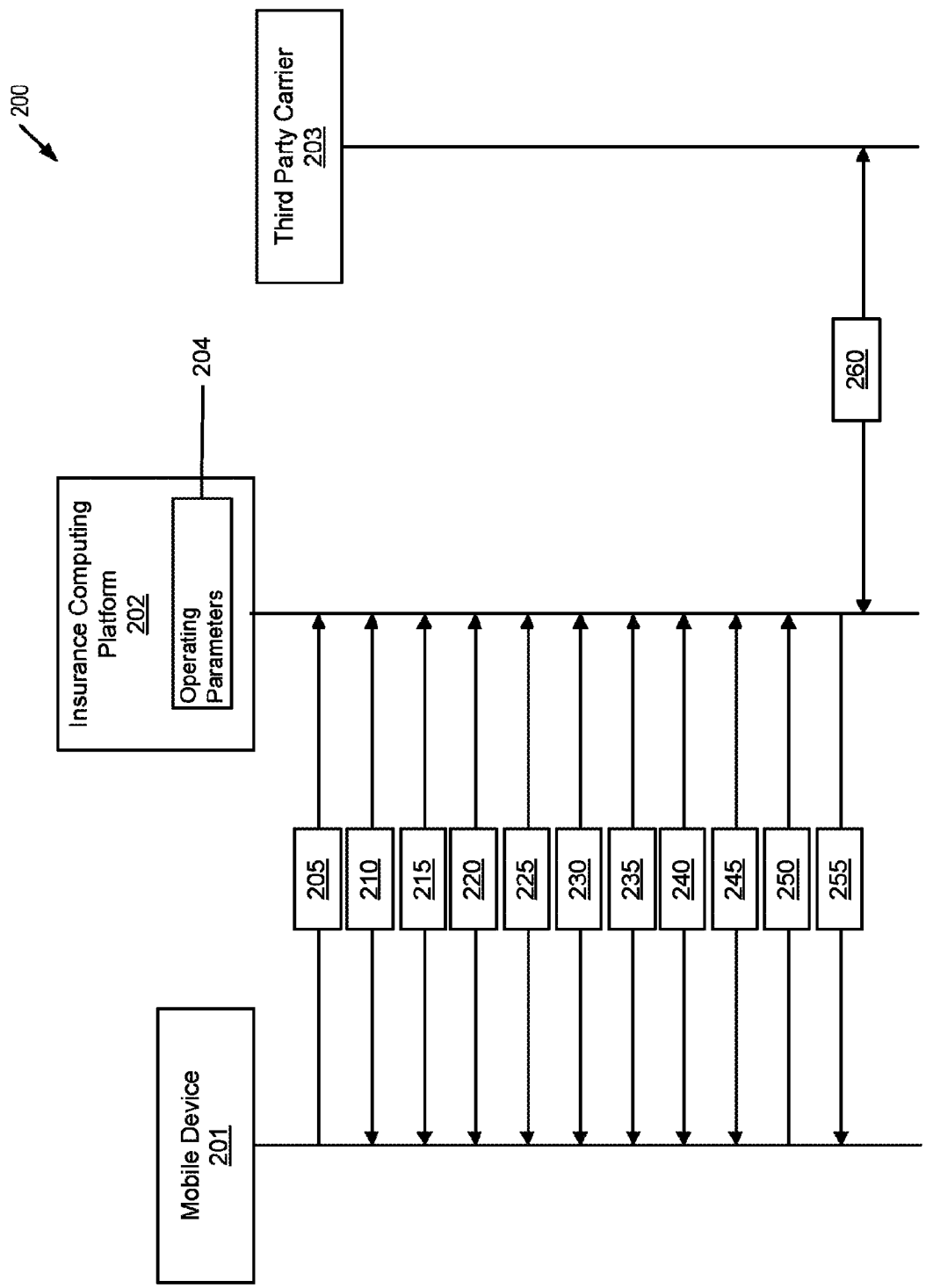
FIG. 2 is a pictorial diagram of a system for remotely testing operational components of a mobile device in accordance with aspects of the disclosure.

FIG. 2 is a pictorial diagram of a system 200 for remotely testing operational components of a mobile device 210 in accordance with aspects of the disclosure. In this example, the system 200 that can enable remote diagnostic testing procedures for mobile device 210 to provide device insurance to a user once the diagnostic testing has completed successfully. As shown in FIG. 2, the system 200 includes an insurance computing platform 202 (which may include server computing device 120) in communication with a mobile device 201 (which may be any one of the client devices 110 and 130) and a third party carrier 203 (which may be any one of the third party carriers 140) over a network, such as network 195 of FIG. 1.

A user of the mobile device 201 (e.g., cellular phone, tablet computer, etc.) can insure the device through interacting with the insurance computing platform 202. In some implementations, the user may access an online service and/or software can be provided to the mobile device 201 in which the user can be displayed available product options (e.g., to register, seek an insurance quote, obtain insurance, submit an insurance claim). The software allows the user to input information, and may bi-directionally communicate with one or more servers of the insurance computing platform 202 to offer the user various products providing insurance protection for the device 201.

The insurance computing platform 202 can receive and respond to requests from mobile device 201 regarding pricing, terms for insurance and processing insurance claims. In some implementations, in response to a request from the user, the insurance computing platform 202 can provide insurance protection for the mobile device 201 in real time or substantially real time (e.g., immediately or shortly after purchase of a policy by user). Such real-time or near real-time provision of insurance protection can be referred to as just-in-time insurance protection. In this regard, the third party carriers 203 can include computing systems operated by insurance carriers offering the insurance protection. The third party carriers 203 can include an API for interacting with the insurance computing platform 202. In some implementations, the insurance computing platform 202 can store a ledger, database, and/or schedule of rates and policies of the third party carriers 203.

To ensure components of the mobile device 201 are operational and/or undamaged prior to issuing the insurance policy, the insurance computing platform 202 remotely determines whether those component are functioning properly. In one implementation, an application can be downloaded or pre-installed onto the mobile device 201 for testing the functionality of the components. The application may guide the user through a series of steps that includes testing various components of mobile device 201 according to predefined operating parameters 204 to generate an output.

If all tests are completed successfully, the mobile device 201 is determined to be in full working condition and thus suitable to be insured. The results of the tests can be recorded on the insurance computing platform 202 using a unique identifier for the device, such as the International Mobile Station Equipment Identity (IMEI) or Unique Device Identifier (UDID) numbers. This helps prevent fraudulent claims by ensuring the correct device is offered insurance. Test failures can disqualify the mobile device 201 from being insured as the device may be already damaged. In some implementations, the user may be required to pay higher premiums for insurance in order to cover higher risk mobile devices associated with the test failures. In some instances, previously run device diagnostic checks can be compared to a diagnostic test run on the same device in real time to determine underwriting risk and prevent fraud. For example, fraud can be determined if prior health checks on the same device determined that there were previous broken components.

In one example of a series of steps to remotely run device diagnostic checks, the insurance computing platform 202 is initially informed that a user associated with mobile device 201 is interested in purchasing device insurance in block 205. In block 210, the insurance computing platform 202 instructs the mobile device 201 to initiate a process (also referred to as "handset health check"). It should be noted that some of the blocks associated with the steps depicted in FIG. 2 can be eliminated or performed in a different order than that depicted. At any time during the test, the user may abort the steps to perform other actions with the mobile device 201.

At the start of the handset health check, a touch screen diagnostic test is performed in block 215. For example, the user may be instructed to swipe/rub and touch the device screen in specific areas or in specific patterns to test for screen cracks, damage, or other faults. A time period may be included providing a limited amount of time for the user to perform the instructed actions. If the screen does not receive input from the user before the time period expires, this may indicate that the screen is broken or the user is delaying before performing the instructed actions. It may be determined whether the screen is operational or non-operational by comparing the user's interaction with the screen to a model input.

In block 220, the handset health check initiates a speaker/microphone diagnostic test. For example, speakers of the device 201 may play a sound file recorded at specific frequency. During this check, the microphone of the device 201 records the sound the speaker generates. The output and input are compared to determine if either the microphone or speaker is damaged. Based on the comparison, it can be determined whether the speaker and microphone are functioning. In the event the test fails, the user may be provided with an option to perform the test again. For example, the test may fail if there is significant background noise that causes an incorrect determination that the microphone or speaker is not functioning properly.

In block 220, the handset health check initiates a camera/flash diagnostic test. For example, the mobile device 201 may be instructed to take pictures with both a front and rear facing cameras to determine whether an image is received. In some implementations, the handset health check initiates a front camera screen diagnostic test. For example, the mobile device 201 may be instructed to take a picture with the front camera screen facing a mirror to determine whether the screen glass of the camera is cracked or damaged. To test if the screen glass is intact, the mobile device 201 can display a registration image on the screen which the camera can detect in the mirror and capture a photograph including a full view of the mobile device 201. By using the reflection in the mirror, the image captured by the mobile device 201 may be analyzed to detect breaks or deformities, which are used to determine if the screen glass and/or the device are damaged.

To test a flash component, the mobile device 201 can take a photograph from the camera (having an associated flash component) with the flash disabled and subsequently (e.g., immediately or soon after) take a second photograph with the flash enabled. The two captured images are compared to detect an increase in brightness between the non-flash and flash photographs and determine whether the flash component is functional.

In block 230, the handset health check initiates a home button diagnostic test. For example, the user is instructed to press a home button of the device 201, and to subsequently interact with the device to return an application to the foreground. In this regard, the home button may serve to bring software of the device to a "home" position, regardless of what application is background or foreground. It can be determined through operating system API calls whether the application transitions to the background, thereby verifying that the home button is operational.

In block 235, the handset health check initiates a volume control button diagnostic test. For example, the user may be instructed to press or toggle the physical volume control buttons (e.g., volume up, volume down, mute, etc.) to determine whether the volume controls are functional (e.g., whether the volume has changed as expected).

In block 240, the handset health check initiates a power button diagnostic test. For example, the user is instructed to press the home and power button simultaneously, which, in some mobile devices, causes the device to take a screenshot of what is displayed. Through operating system API calls the application can detect whether the screenshot has been captured to determine whether the buttons are functional. It is noted that this testing requires both the power and home button to be operational and failure to take a screenshot may indicate failure of one or both buttons.

In block 245, the handset health check initiates a charging port diagnostic test. For example, the user is instructed to plug the mobile device 201 into power to verify if charging/charging port is functional.

In block 250, the handset health check initiates a battery diagnostic test. For example, data from the battery usage and life-cycles may be checked to see determine the useful life of the battery and/or if the device may need a replacement battery.

Test results are recorded with the insurance computing platform 202 along with the device identification. In block 255, the insurance computing platform 202 may transmit a notification to the user indicating that the iterative testing process is complete. Based on the test, the insurance computing platform 202 may determine whether the device passed all tests. If the mobile device 201 does not pass a determined number of the tests, the user may be presented with the failed results, provide next steps instructions, and the process may end.

If the mobile device 201 passes all the tests, the user is able to purchase insurance for the device. In block 260, the insurance computing platform 202, in conjunction with the third party carrier 203, prepares and transmits available plans to the mobile device 201 for review by the user. At this point, the user may proceed by selecting a product and proceed with a purchase to insure the device 201.

Figure 3:
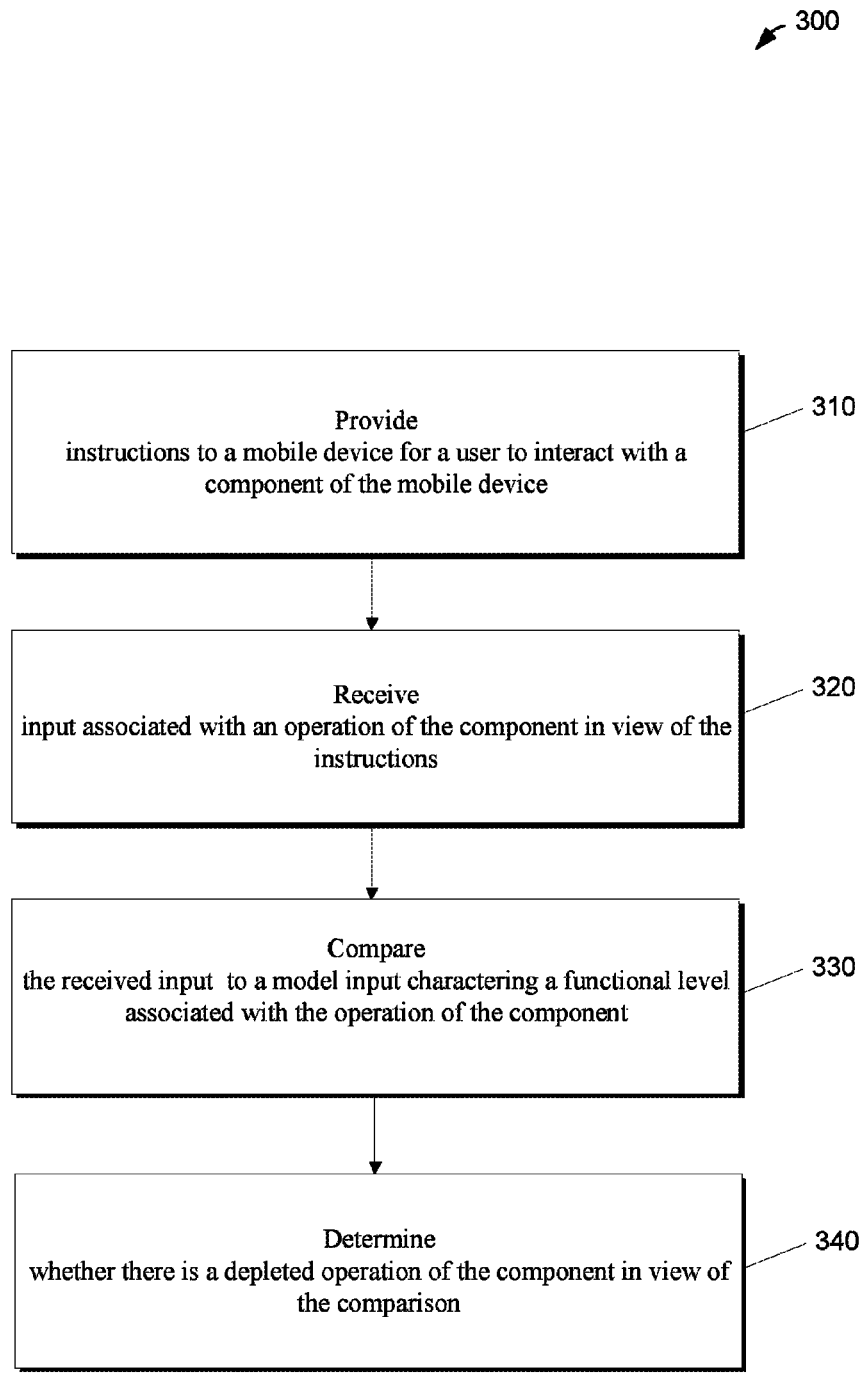
FIG. 3 is data flow diagram illustrating an implementation of a method of remotely testing operational components of a mobile device in accordance with implementations of the disclosure.

FIG. 3 is a data flow diagram 300 illustrating an implementation of a method of providing for remotely testing operational components of a mobile device in accordance with implementations of the disclosure. In one implementation, a computing device, such as server device 120 of FIG. 1, may perform method 300. The method 300 may be performed by processing logic that may comprise hardware (circuitry, dedicated logic, etc.), software (e.g., software executed by a general purpose computer system or a dedicated machine), or a combination of both. In alternative implementations, some or all of the method 300 may be performed by other components of a shared storage system. It should be noted that blocks depicted in FIG. 3 can be performed simultaneously or in a different order than that depicted.

Method 300 begins at block 310 where instructions are provided to a mobile device for a user to interact with a component of the mobile device. The component of the device can include, for example, touchscreen display. In some implementations, the touchscreen can display text and/or include graphics instructing the user to interact (e.g., press, swipe, and the like) with the display according to a specific pattern, gesture (e.g., swiping) or specific areas of the touchscreen.

In block 320, input associated with an operation of the component in view of the instructions is received. The received input is compared in block 330 with respect to a model input characterizing a functional level associated with the operation of the component. For example, if the component is a touchscreen, the model input can include data characterizing a proximity of a location (on the display) and sequences (in time) of the user touching the screen that correspond with the instructions. The model input can be determined and/or predefined. For example, the model input can be measured by a similar known-to-be operational component and/or known-to-be operational device that are previously stored on the mobile device or the platform.

In block 340, it is determined whether there is a depleted operation of the component in view of the comparison. For example, the data associated with the operation based on the user input can be compared to a set of model inputs and, if they are sufficiently similar, it can be determined that the component is operational. In some implementations, results of the determination can be provided, for example, to an insurance underwriting for provision device insurance (e.g., personal property insurance) for the mobile device.

Figure 4:
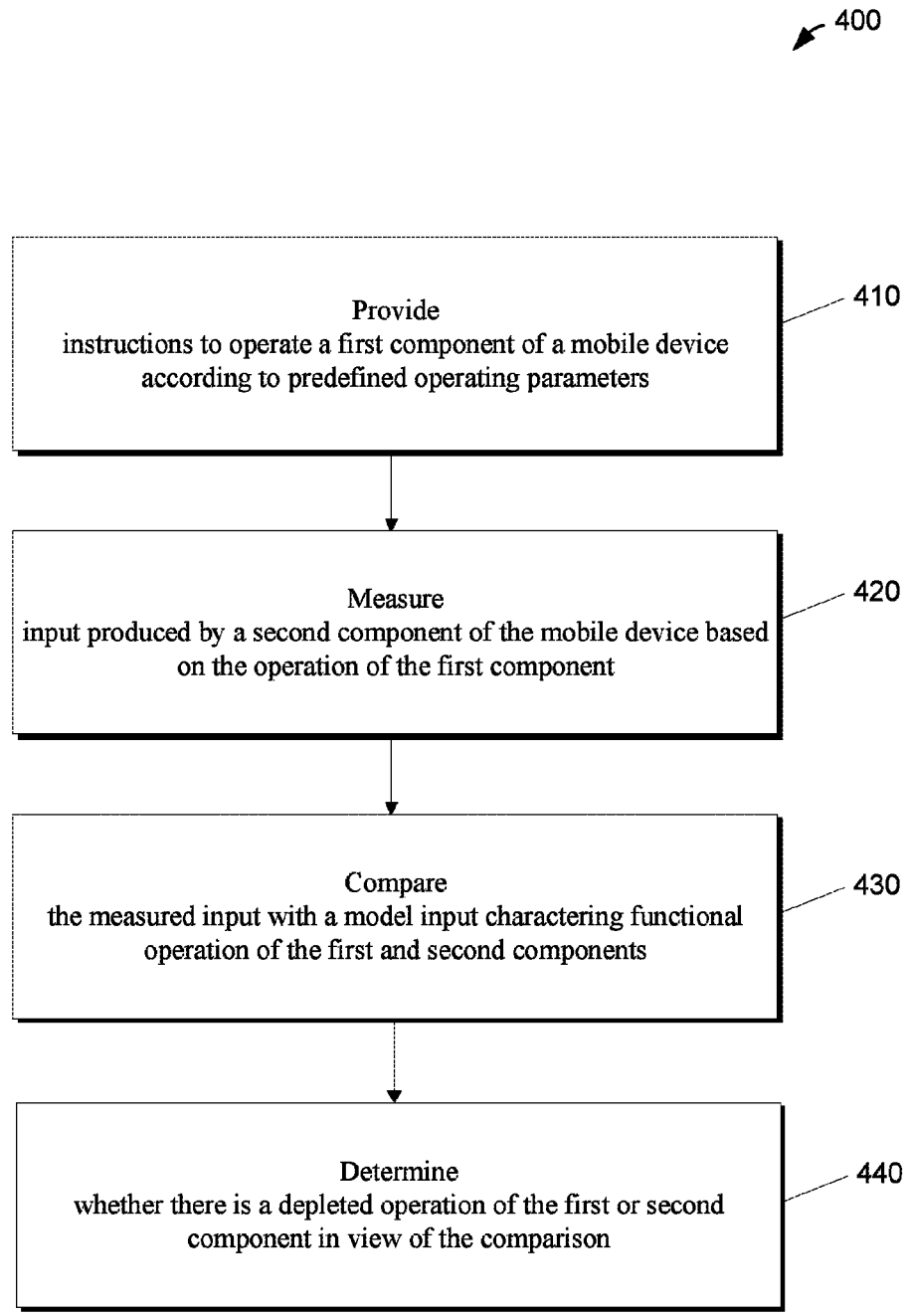
FIG. 4 is a data flow diagram illustrating an implementation of another method of remotely testing operational components of a mobile device in accordance with implementations of the disclosure.

FIG. 4 is a data flow diagram 400 illustrating an implementation of a method of providing for remotely testing operational components of a mobile device in accordance with implementations of the disclosure. In one implementation, a computing device, such as server device 120 of FIG. 1, may perform method 400. The method 400 may be performed by processing logic that may comprise hardware (circuitry, dedicated logic, etc.), software (e.g., software executed by a general purpose computer system or a dedicated machine), or a combination of both. In alternative implementations, some or all of the method 400 may be performed by other components of a shared storage system. It should be noted that blocks depicted in FIG. 4 can be performed simultaneously or in a different order than that depicted.

Method 400 begins at block 410 where instructions to operate a first component of a mobile device according a set of operating parameters. The component of the device can include, for example, a speaker component. In some implementations, the operating parameters can include, for example, a predefined audio file to be played by the speaker component or instructions to take a photo with the camera component with and without a flash activation.

In block 420, input produced by a second component of the mobile device based on the operation of the first component is measured in view of the instructions. For example, a microphone component of the mobile device can be instructed to record sound concurrently with the speaker component playing the predefined audio file. The measured data is compared is block 430 with respect to expect input characterizing the functional operation of the first and second components. The model input can be determined and/or predefined. For example, the model input can be measured by a similar known-to-be operational component and/or known-to-be operational device that are previously stored on the mobile device or the platform.

In block 440, it is determined whether there is a depleted operation of the first or second component in view of the comparison. For example, the measured input associated with the operation can be compared to a set of model inputs and, if they are sufficiently similar, it can be determined that the component is operational. In some implementations, results of the determination can be provided, for example, to an insurance underwriting for provision device insurance (e.g., personal property insurance) for the mobile device.

Figure 5:
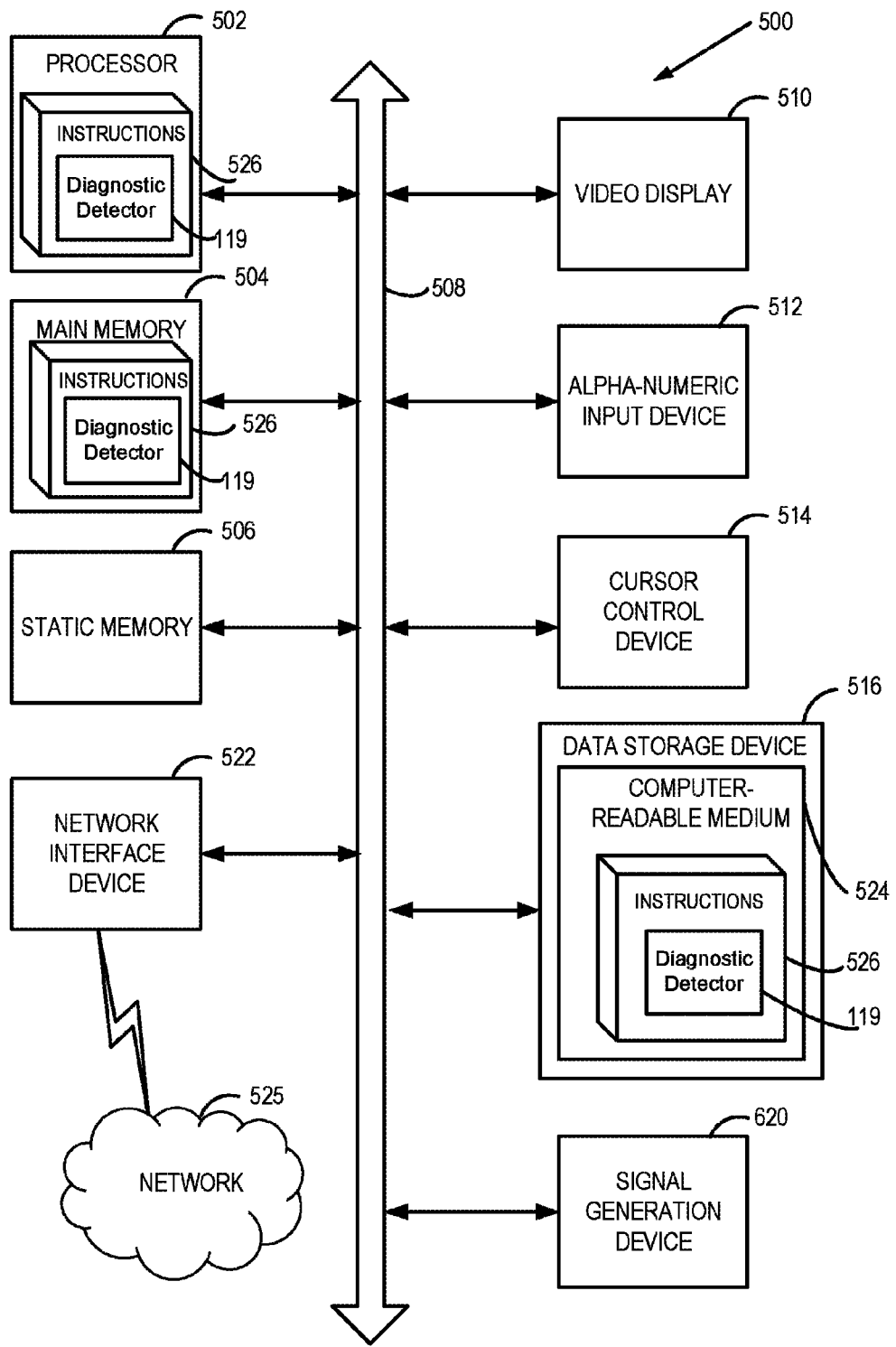
FIG. 5 illustrates a diagrammatic representation of a machine in the exemplary form of a computer system.

FIG. 5 illustrates a diagrammatic representation of a machine in the exemplary form of a computer system 500 within which a set of instructions, for causing the machine to perform any one or more of the methodologies discussed herein, may be executed. In alternative implementations, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a personal digital assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 may be comprised of a processing device 502 (which may correspond to a server computing device, such as server device 120, within system 100 of FIG. 1), a main memory 504 (e.g., read-only memory (ROM), flash memory, dynamic random access memory (DRAM) (such as synchronous DRAM (SDRAM) or Rambus DRAM (RDRAM), etc.), a static memory 506 (e.g., flash memory, static random access memory (SRAM), etc.), and a data storage device 516, which communicate with each other via a bus 508.

In a further aspect, the computer system 500 may include a processing device 502 (which may correspond to processing device 112), a volatile memory 504 (e.g., random access memory (RAM)), a nonvolatile memory 506 (e.g., read-only memory (ROM) or electrically-erasable programmable ROM (EEPROM)), and a data storage domain 516, which may communicate with each other via a bus 508.

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. Processing device 502 is configured to execute processing logic (e.g., instructions 526) for performing the operations and steps discussed herein.

Computer system 500 may further include a network interface device 522. Computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

Data storage device 516 may include a machine-readable storage medium (or more specifically a computer-readable storage medium) 524 having one or more sets of instructions 526 embodying any one or more of the methodologies of functions described herein, including instructions encoding the techniques including the diagnostic detector 119 of FIG. 1 to implement method 300 of FIG. 3 and method 400 of FIG. 4 for remotely testing operational components of a mobile device. In some implementations, the diagnostic detector 119 may also reside, completely or at least partially, within main memory 504 and/or within processing device 502 during execution thereof by computer system 500; main memory 504 and processing device 502 also constituting machine-readable storage media. The diagnostic detector 119 may further be transmitted or received over a network 525 via network interface device 522.

Instructions 526 may also reside, completely or partially, within volatile memory 504 and/or within processing device 502 during execution thereof by computer system 500, hence, volatile memory 504 and processing device 502 may also constitute machine-readable storage media.

While a non-transitory machine-readable storage medium 524 is shown in an exemplary implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instruction for execution by the machine and that causes the machine to perform any one or more of the methodologies of the disclosure. The term "machine-readable storage medium" shall accordingly be taken to include, but not be limited to, solid-state memories, and optical and magnetic media.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be in any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to include, "based at least in part on," such that an un-recited feature or element is also permissible.

Some portions of the detailed descriptions are presented in terms of algorithms and symbolic representations of operations on data bits within a computer memory. These algorithmic descriptions and representations are the means used by those skilled in the video processing arts to most effectively convey the substance of their work to others skilled in the art. An algorithm is here, and generally, conceived to be a self-consistent sequence of steps leading to a desired result. The steps are those requiring physical manipulations of physical quantities.

It should be borne in mind, however, that all of these and similar terms are to be associated with the appropriate physical quantities and are merely convenient labels applied to these quantities. Unless specifically stated otherwise, as apparent from the above discussion, it is appreciated that throughout the description, discussions utilizing terms such as "receiving", "providing", "measuring", "determining", "generating", "executing", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples described herein also relate to an apparatus for performing the methods described herein. This apparatus may be specially constructed for performing the methods described herein, or it may comprise a general-purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 300 and 400 and/or each of its individual functions, routines, subroutines, or operations. Examples of the structure for a variety of these systems are set forth in the description above.

Whereas many alterations and modifications of the disclosure will no doubt become apparent to a person of ordinary skill in the art after having read the foregoing description, it is to be understood that any particular implementation shown and described by way of illustration is in no way intended to be considered limiting. Therefore, references to details of various implementations are not intended to limit the scope of the claims, which in themselves recite only those features regarded as the disclosure.

What is claimed is:

1. A system comprising:
   a memory to store operating parameters; and
   a processing device, operatively coupled to the memory, to:
   provide instructions to operate a first component of a mobile device according a set of operating parameters;
   measure input produced by a second component of the mobile device based on the operation of the first component;
   compare the measured input with a model input charactering functional operation of the first and second components; and
   determine whether there is a depleted operation of the first or second components in view of the comparison, where to determine, the processing device to:
   provide a multimedia file in accordance with the set of operating parameters, the multimedia file being recorded at a determined frequency and amplitude level;
   execute the multimedia file with the first component; and
   determine whether the measured input produced by the second component corresponds with the determined frequency and amplitude level.

2. The system of claim 1, wherein the processing device is further to, responsive to determining that the component is operational in accordance with a vendor specific, generate a diagnostic message regarding the mobile device to send to a carrier processing device to provision products for the mobile device.

3. The system of claim 1, wherein the processing device is further to generate an error metric based on a difference between the measured input and the model input.

4. The system of claim 3, wherein the processing device is further to determine whether the error metric meets a threshold level for the component.

5. The method of claim 1, wherein the processing device is further to store results of the determination with a unique identifier associated with the mobile device.

6. The system of claim 5, wherein the processing device is further to:
   determine that the component is operational; and
   transmit the results of the determination to a display indicating that products are available for the mobile device.

7. A non-transitory computer-readable medium comprising instructions that, when executed by a processing device, cause the processing device to:
   provide, by the processing device, instructions to operate a first component of a mobile device according a set of operating parameters;

measure input produced by a second component of the mobile device based on the operation of the first component;

compare the measured input with a model input characterizing a functional operation of the first and second components; and determine whether there is a depleted operation of the first or second components in view of the comparison, where to determine, the processing device to:

provide a multimedia file in accordance with the set of operating parameters, the multimedia file being recorded at a determined frequency and amplitude level;

execute the multimedia file with the first component; and determine whether the measured input produced by the second component corresponds with the determined frequency and amplitude level.

8. The non-transitory computer-readable medium of claim 7, wherein the processing device is further to, responsive to determining that the component is operational in accordance with a vendor specific, generate a diagnostic message regarding the mobile device to send to a carrier processing device to provision products for the mobile device.

9. The non-transitory computer-readable medium of claim 7, wherein the processing device is further to generate an error metric based on a difference between the received input and the model input.

10. The non-transitory computer-readable medium of claim 9, wherein the processing device is further to determine whether the error metric meets a threshold level for the component.

11. The non-transitory computer-readable medium of claim 7, wherein the processing device is further to store results of the determination with a unique identifier associated with the mobile device.

12. The non-transitory computer-readable medium of claim 11, wherein the processing device is further to:

determine that the component is operational; and providing the results of the determination at a display indicating that products are available for the mobile device.

* * * * *